(12) United States Patent
Seok

(10) Patent No.: US 9,426,764 B2
(45) Date of Patent: Aug. 23, 2016

(54) METHOD AND APPARATUS FOR ACCESSING CHANNEL IN WLAN SYSTEM

(71) Applicant: LG Electronics Inc., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 14/377,445

(22) PCT Filed: Feb. 12, 2013

(86) PCT No.: PCT/KR2013/001075
§ 371 (c)(1),
(2) Date: Aug. 7, 2014

(87) PCT Pub. No.: WO2013/119095
PCT Pub. Date: Aug. 15, 2013

(65) Prior Publication Data
US 2015/0341880 A1 Nov. 26, 2015

Related U.S. Application Data

(60) Provisional application No. 61/597,681, filed on Feb. 10, 2012, provisional application No. 61/598,826, filed on Feb. 14, 2012.

(51) Int. Cl.
*H04W 56/00* (2009.01)
*H04W 72/04* (2009.01)
(Continued)

(52) U.S. Cl.
CPC ......... *H04W 56/0015* (2013.01); *H04L 7/0008* (2013.01); *H04W 56/0085* (2013.01); *H04W 72/044* (2013.01); *H04W 52/0216* (2013.01); *H04W 84/12* (2013.01)

(58) Field of Classification Search
CPC .......... H04W 56/0015; H04W 72/044; H04W 56/0085; H04W 84/12; H04W 52/0216; H04L 7/0008
See application file for complete search history.

(56) References Cited

U.S. PATENT DOCUMENTS 8,094,611 B2 1/2012 Li et al.
8,755,315 B1 * 6/2014 Kukanur ............... G08C 17/02
370/252

(Continued)

FOREIGN PATENT DOCUMENTS

CA 2782730 A1 6/2011
KR 10-2010-0105744 9/2010

OTHER PUBLICATIONS

"AP Assisted Medium Synchronization", M. Park et al., IEEE 802.11-12/0840r0, Jul. 16, 2012, pp. 1-15, XP068039370.

*Primary Examiner* — Ajay Cattungal
(74) *Attorney, Agent, or Firm* — Dentons US LLP

(57) ABSTRACT

The present invention relates to a wireless communication system, and more specifically, disclosed are a method and an apparatus for accessing a channel in a WLAN system. A method for synchronizing channels from a station (STA) in the wireless communication system, according to one embodiment of the present invention, comprises the steps of: receiving from an access point (AP) setting information with respect to an least one slot allowing channel access by the STA; receiving a synchronization frame from the AP from a slot boundary of the at least one slot; and synchronizing the channels on the basis of the synchronization frame, wherein the synchronization frame may be a null data packet (NDP) frame.

13 Claims, 22 Drawing Sheets

(51) Int. Cl.
  *H04L 7/00* (2006.01)
  *H04W 84/12* (2009.01)
  *H04W 52/02* (2009.01)

(56) References Cited

U.S. PATENT DOCUMENTS

| | | |
|---|---|---|
| 2007/0160021 A1 | 7/2007 | Xhafa et al. |
| 2007/0161364 A1* | 7/2007 | Surineni ........... H04W 52/0225 455/343.4 |
| 2009/0092122 A1 | 4/2009 | Czaja et al. |
| 2011/0103352 A1* | 5/2011 | Wentink .............. H04W 74/008 370/336 |
| 2011/0128947 A1* | 6/2011 | Liu .................... H04L 25/03343 370/338 |
| 2013/0170345 A1* | 7/2013 | Merlin ................ H04W 28/065 370/230 |

* cited by examiner

FIG. 7
(a) 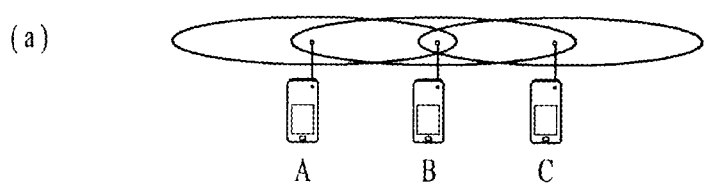
(b) 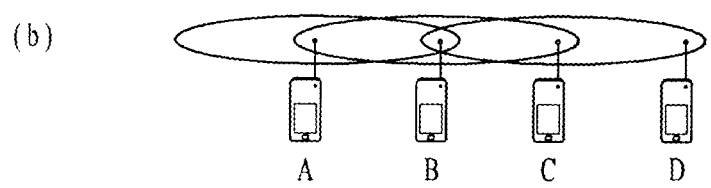

FIG. 8
(a) 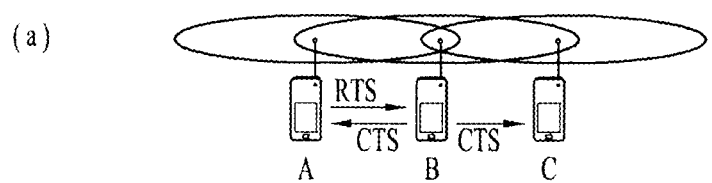
(b) 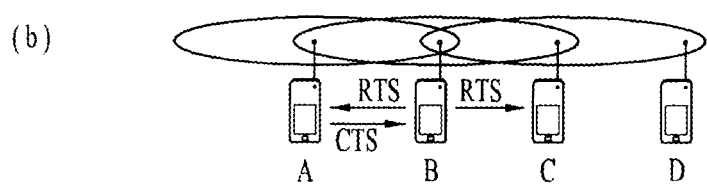

FIG. 18

| Element ID | Length | Target Awake Time Start Offset | Target Awake Time Interval | Target Awake STAs or GID at Target Awake Time #n |
|---|---|---|---|---|
| Octet : 1 | 1 | 4 | 4 | 4*n |

FIG. 20
(a) Legacy PPDU format 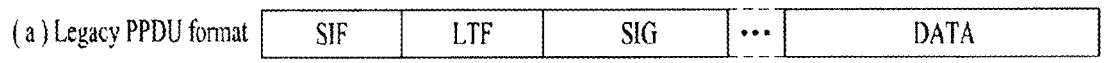
(b) Legacy CTS frame format (MAC frame format) 
(c) NDP frame format 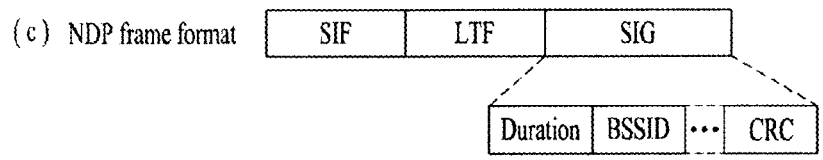

METHOD AND APPARATUS FOR ACCESSING CHANNEL IN WLAN SYSTEM

This application is a 35 USC §371 National Stage entry of International Application No. PCT/KR2013/001075 filed on Feb. 12, 2013 and claims priority to U.S. Provisional Application No. 61/597,681, filed Feb. 10, 2012, and U.S. Provisional Application No. 61/598,826, filed Feb. 14, 2012 all of which are incorporated by reference in their entirety herein.

FIELD OF THE INVENTION

The present invention relates to a wireless communication system, and more particularly to a method and apparatus for performing channel access in a wireless LAN system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the disadvantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DETAILED DESCRIPTION OF THE INVENTION

Technical Problem

Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

Communication in the WLAN system is performed in a medium shared by all devices. If the number of devices engaged in M2M communication increases, consumption of a long time for channel access of a single device may unavoidably deteriorate the overall system throughput, and may prevent power saving of the respective devices.

An object of the present invention is to provide a new channel access method for reducing not only a duration time consumed for channel access but also power consumption of the device.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing channel synchronization by a station (STA) of a wireless communication system including: receiving configuration information regarding at least one slot in which channel access of the station (STA) is allowed, from an access point (AP); receiving a synchronization frame from the access point (AP) at a slot boundary of the at least one slot; and performing the channel synchronization on the basis of the synchronization frame, wherein the synchronization frame is a null data packet (NDP) frame.

In accordance with another aspect of the present invention, a station (STA) device configured to perform channel synchronization in a wireless communication system includes: a transceiver; and a processor, wherein the processor receives configuration information regarding at least one slot in which channel access of the station (STA) is allowed, from an access point (AP) using the transceiver, receives a synchronization frame from the access point (AP) at a slot boundary of the at least one slot using the transceiver, and performs the channel synchronization on the basis of the synchronization frame, wherein the synchronization frame is a null data packet (NDP) frame.

The following description may be commonly applied to the embodiments of the present invention.

The synchronization frame may be a PLCP (Physical Layer Convergence Protocol) Packet Data Unit (PPDU) frame including a Short Training Field (STF), a Long Training Field (LTF), and a signal (SIG) field without inclusion of a data field.

The SIG field may include a Basic Service Set Identifier (BSSID) field and a duration field.

The BSSID field may include identifier (ID) information of the access point (AP).

A Network Allocation Vector (NAV) of STAs other than the station (STA) may be configured on the basis of a value of the duration field.

The station (STA) may be switched form a doze state to an awake state.

If a transmission opportunity (TXOP) of the station (STA) is not allowed to overlap the slot boundary, channel access may be initiated without performing of clear channel assessment (CCA).

The CCA may be performed until a frame sequence for allowing the station (STA) to configure a network allocation vector (NAV), or until a period of time equal to a Probe Delay value has transpired.

The slot boundary may be a time point at which channel access of the station (STA) is allowed.

The slot may be an interval between two contiguous time points.

The time point at which the channel access is allowed may be a target awake time of the station (STA).

A plurality of slots may be configured during a single beacon interval.

The configuration information of the at least one slot may be provided through a beacon frame.

The configuration information of the at least one slot may be configuration information of a time period in which restricted channel access of the station (STA) is allowed.

It is to be understood that both the foregoing general description and the following detailed description of the present invention are exemplary and explanatory and are intended to provide further explanation of the invention as claimed.

Effects of the Invention

As is apparent from the above description, the embodiments of the present invention provide a new channel access method so that a method and apparatus for reducing not only a time consumed for channel access but also power consumption of the device can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 7 is a conceptual diagram illustrating a hidden node and an exposed node.

FIG. 8 is a conceptual diagram illustrating RTS (Request To Send) and CTS (Clear To Send).

FIG. 18 is a conceptual diagram illustrating an exemplary target awake time information element format according to an exemplary embodiment.

FIG. 20 is a conceptual diagram illustrating an NDP frame format according to an exemplary embodiment

BEST MODE FOR CARRYING OUT THE INVENTION

Figure 1:
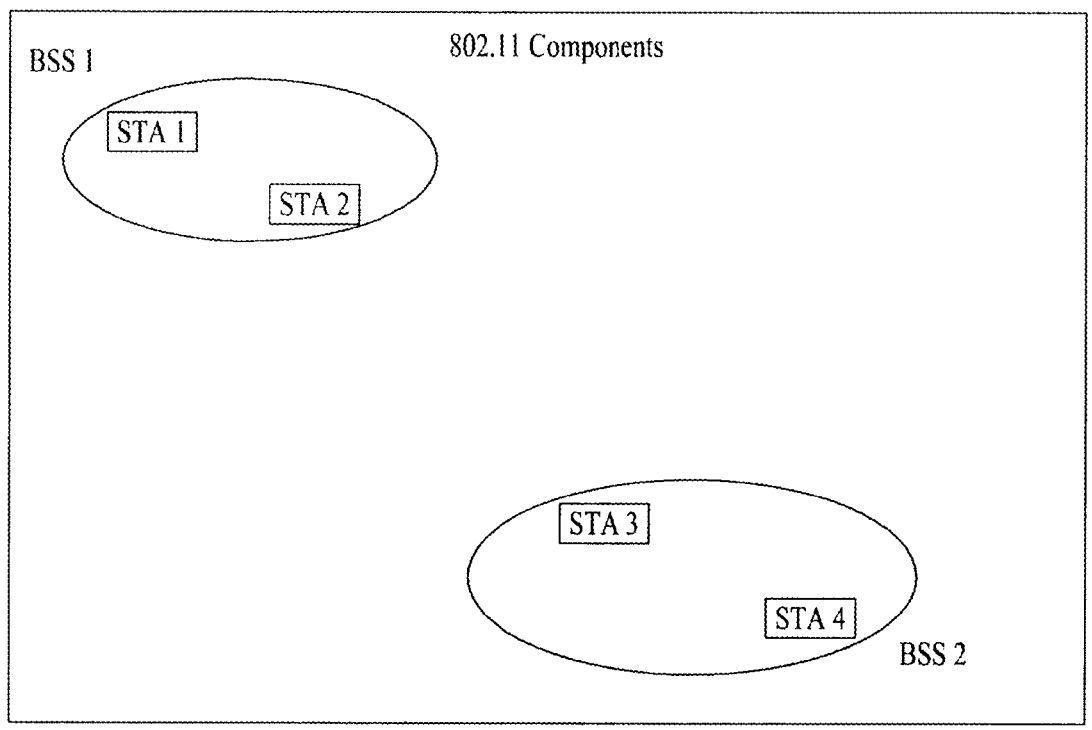
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
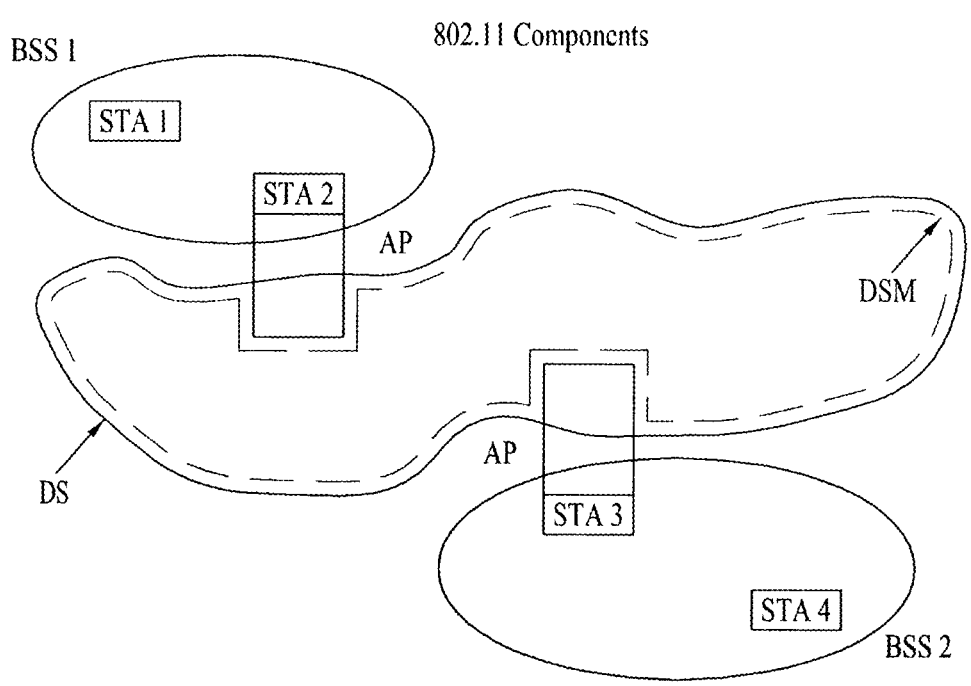
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are interconnected. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
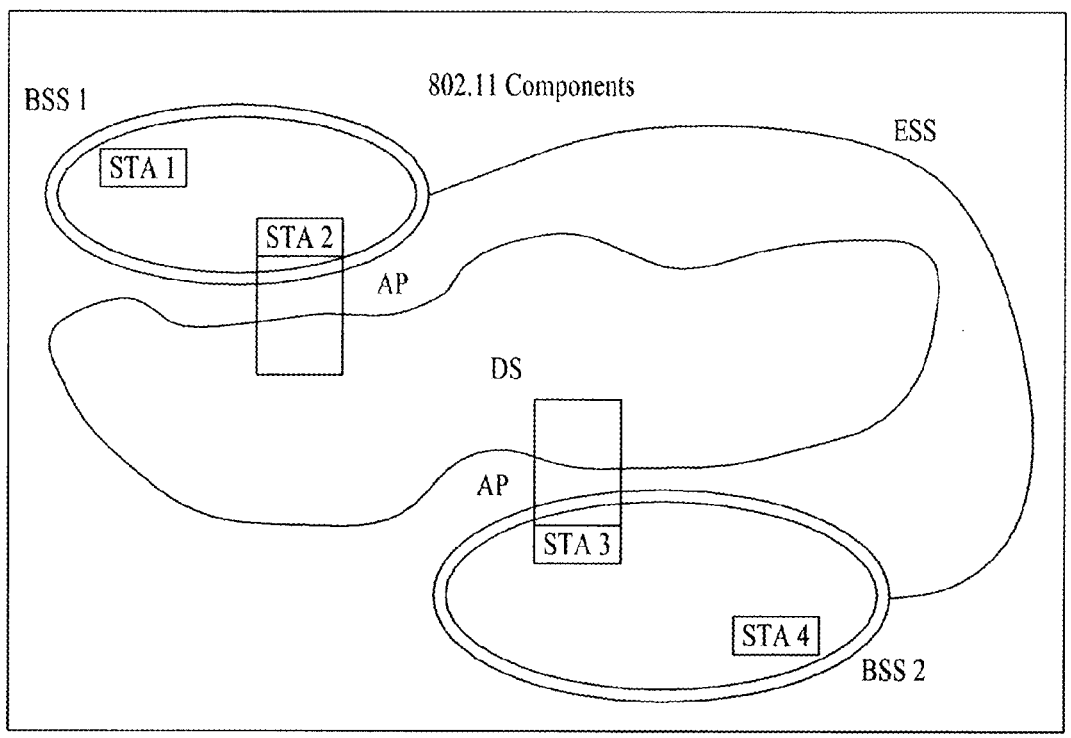
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to as an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
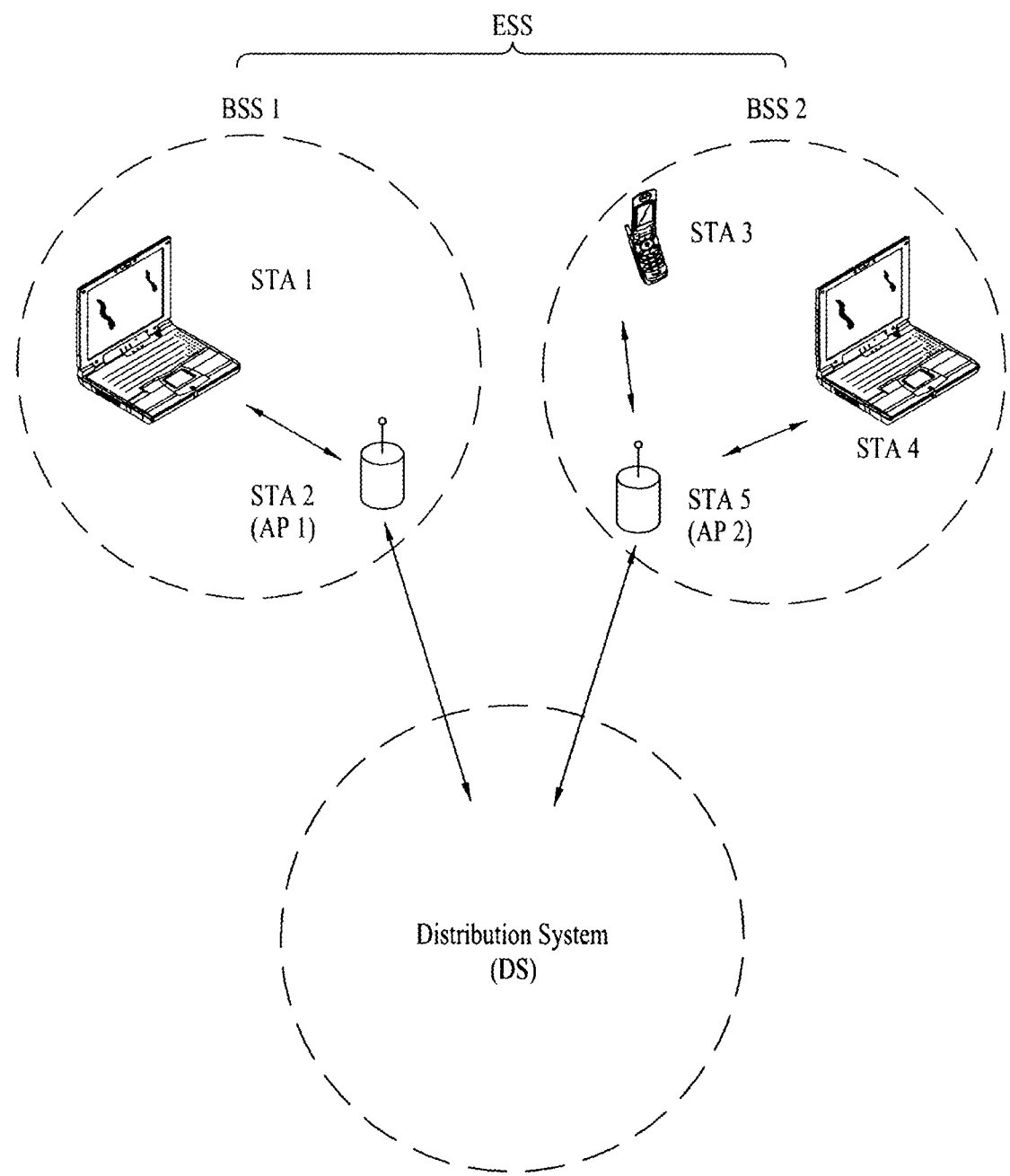
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
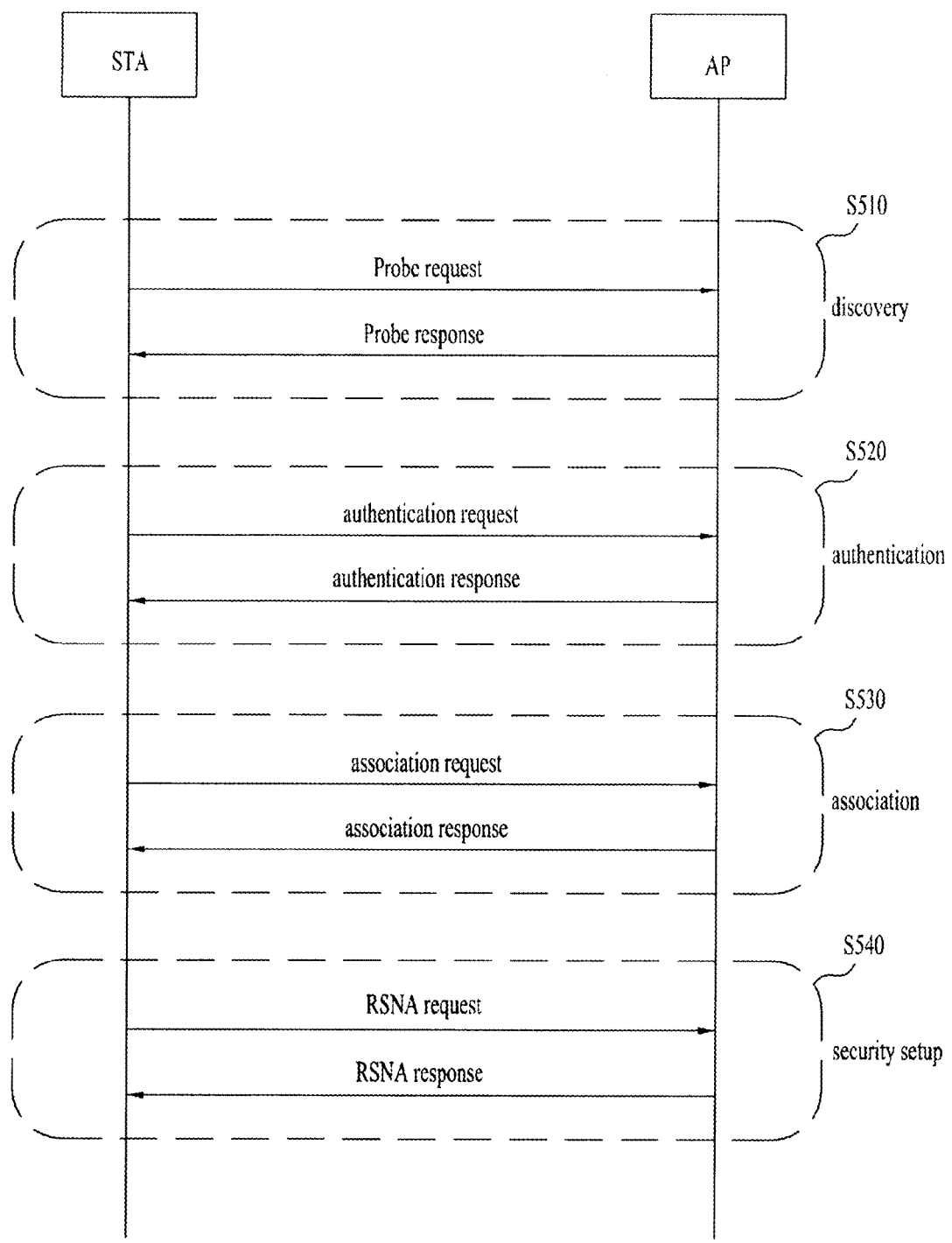
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

The link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives a beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, active scanning is more advantageous than passive scanning in terms of delay and power consumption.

After the STA discovers the network, the STA may perform the authentication process in step S520. The authentication process may be referred to as a first authentication process to clearly distinguish the authentication process from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a higher throughput (HT) higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (WS) such as an idle frequency band (for example, 54-698 MHz band) abandoned because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth of the WS band is occupied, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. A technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support a method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate will participate in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval will participate in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into a WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start transmission, establishes a delay time (for example, a random back off period) for medium access, and attempts to start frame transmission after waiting for a predetermined time. Through application of a random backoff period, it is expected that multiple STAs will attempt to start frame transmission after waiting for different times, resulting in minimum collision.

In addition, the IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
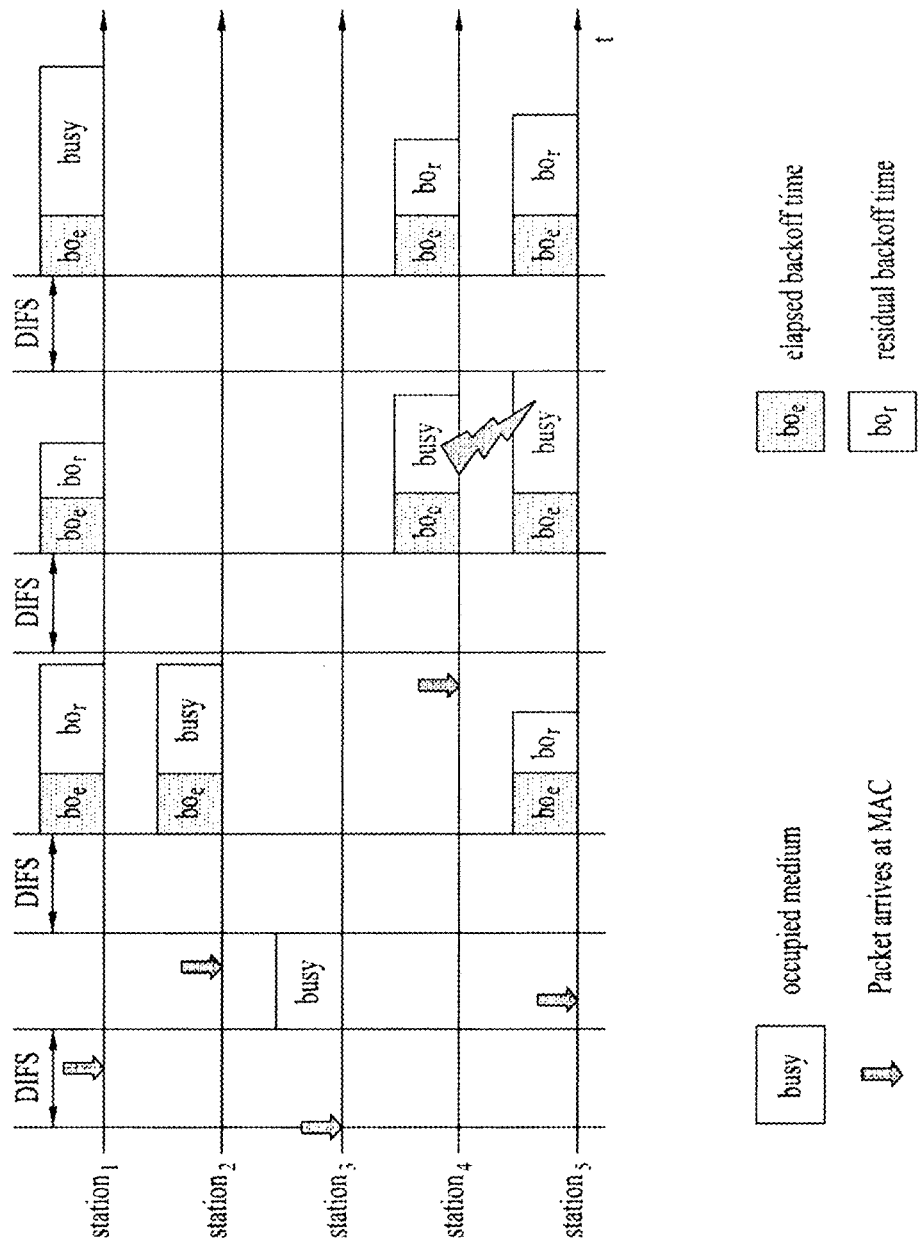
FIG. 6 is a conceptual diagram illustrating a back off process.

FIG. 6 is a conceptual diagram illustrating a back off process.

Operations based on a random back off period will hereinafter be described with reference to FIG. 6. If the occupy- or busy-state medium is shifted to an idle state, several STAs may attempt to transmit data (or frame). As a method for implementing a minimum number of collisions, each STA selects a random back off count, waits for a slot time corresponding to the selected back off count, and then attempts to start data transmission. The random back off count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random back off process starts operation, the STA continuously monitors the medium while counting down the back off slot in response to the decided backoff count value. If the medium is in the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the back off slot in response to a random back off count value selected by each STA. The example of FIG. 6 shows that STA2 selects the lowest back off count value and STA1 selects the highest back off count value. That is, after STA2 finishes back off counting, the residual back off time of STA5 at a frame transmission start time is shorter than the residual back off time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts back off counting. That is, after the remaining back off slot as long as the residual back off time is counted down, frame transmission may start operation. Since the residual back off time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random back off count value selected by the STA4, and then starts frame transmission. FIG. 6 exemplarily shows the case in which the residual back off time of STA5 is identical to the random back off count value of STA4 by chance. In this case, unexpected collision may occur between STA4 and STA5. If the collision occurs between STA4 and STA5, each of STA4 and STA5 does not receive ACK, resulting in the occurrence of data transmission failure. In this case, each of STA4 and STA5 increases the CW value two times, and STA4 or STA5 may select a random back off count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual back off time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA of the remaining time for which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be given with reference to FIGS. 7 and 8. Although an actual carrier sensing range is different from a transmission range, it is assumed that the actual carrier sensing range is identical to the transmission range for convenience of description and better understanding of the present invention.

FIG. 7 is a conceptual diagram illustrating a hidden node and an exposed node.

FIG. 7(*a*) exemplarily shows the hidden node. In FIG. 7(*a*), STA A communicates with STA B, and STA C has information to be transmitted. In FIG. 7(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in collision. Here, STA A may be considered a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows a method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., an STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

Power consumption is reduced in proportion to a specific time in which the STA stays in the sleep state, such that the STA operation time is increased in response to the reduced power consumption. However, it is impossible to transmit or receive a frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to periodically switch to the awake state in order to recognize the presence or absence of a frame to be transmitted to the STA (or in order to receive a signal indicating the presence of the frame on the assumption that the presence of the frame to be transmitted to the STA is decided).

Figure 9:
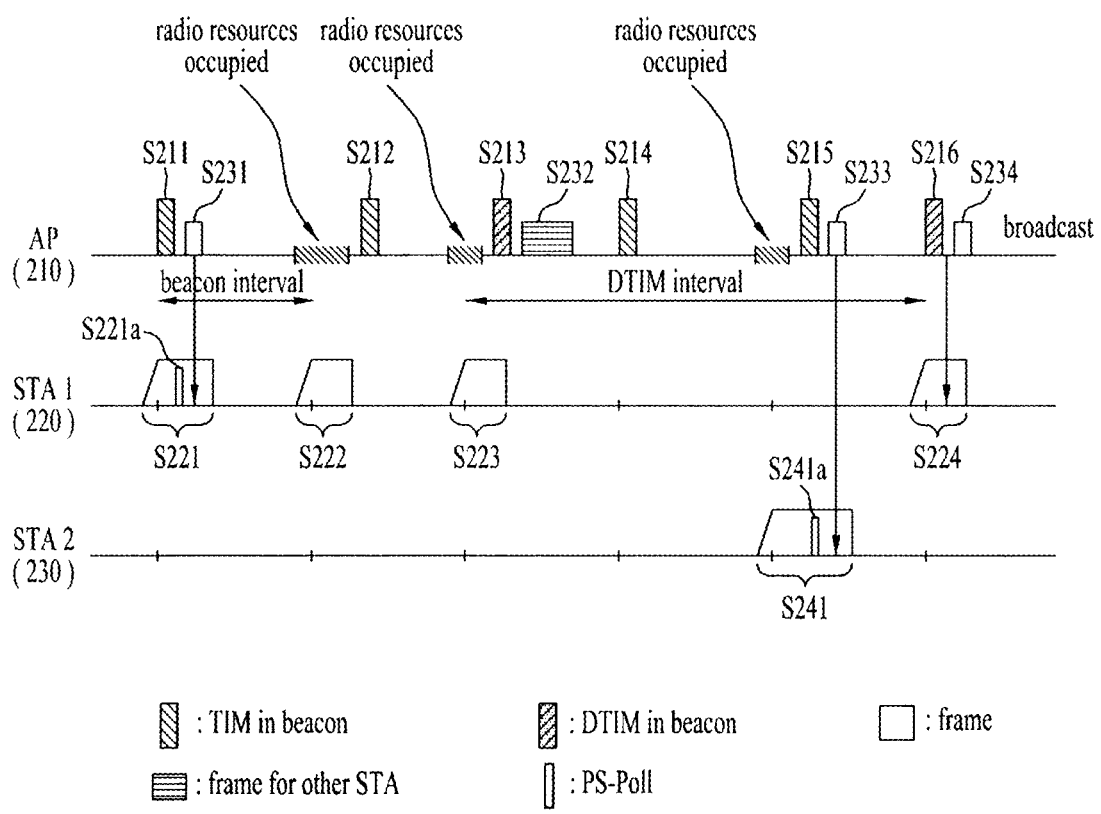
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame and, as such, re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 but there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, which has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
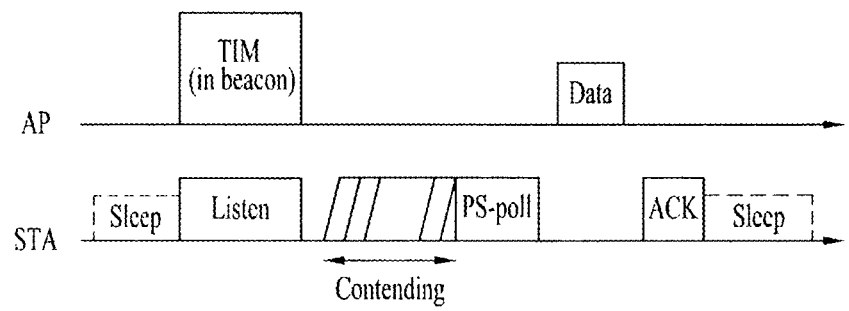
FIGS. 10 to 12 are conceptual diagrams illustrating detailed operations of a station (STA) having received a Traffic Indication Map (TIM).
Figure 11:
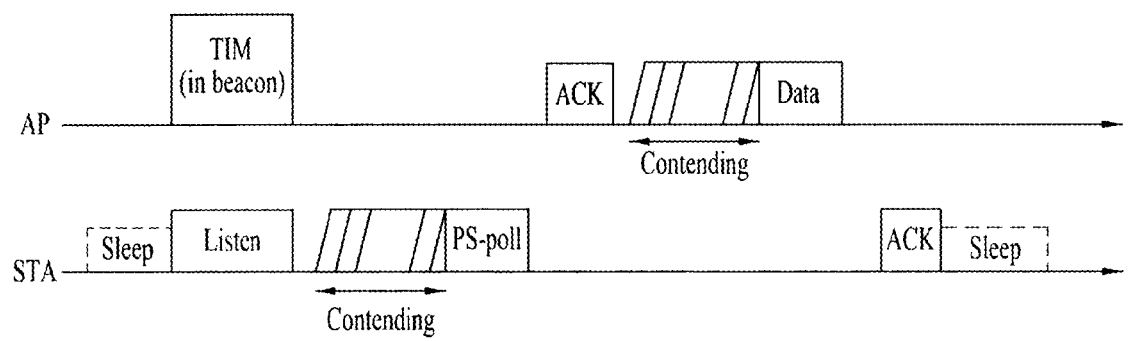
Figure 12:
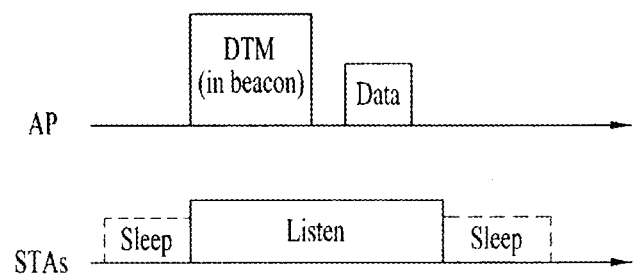

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be given with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of contention. STA may transmit the ACK frame indicating successful reception of a data frame to the AP, and may then be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintain the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may have a value of 1 to 2007. In the case of the current WLAN system, 14 bits for AID may be allocated to a frame transmitted by AP and/or STA. Although the AID value may be assigned a maximum value of 16383, the values of 2008 to 16383 are set to reserved values.

The TIM element according to legacy definition is inappropriate for M2M communication through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which a low transfer rate is considered. In addition, it is expected that there will be a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a header part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, and the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
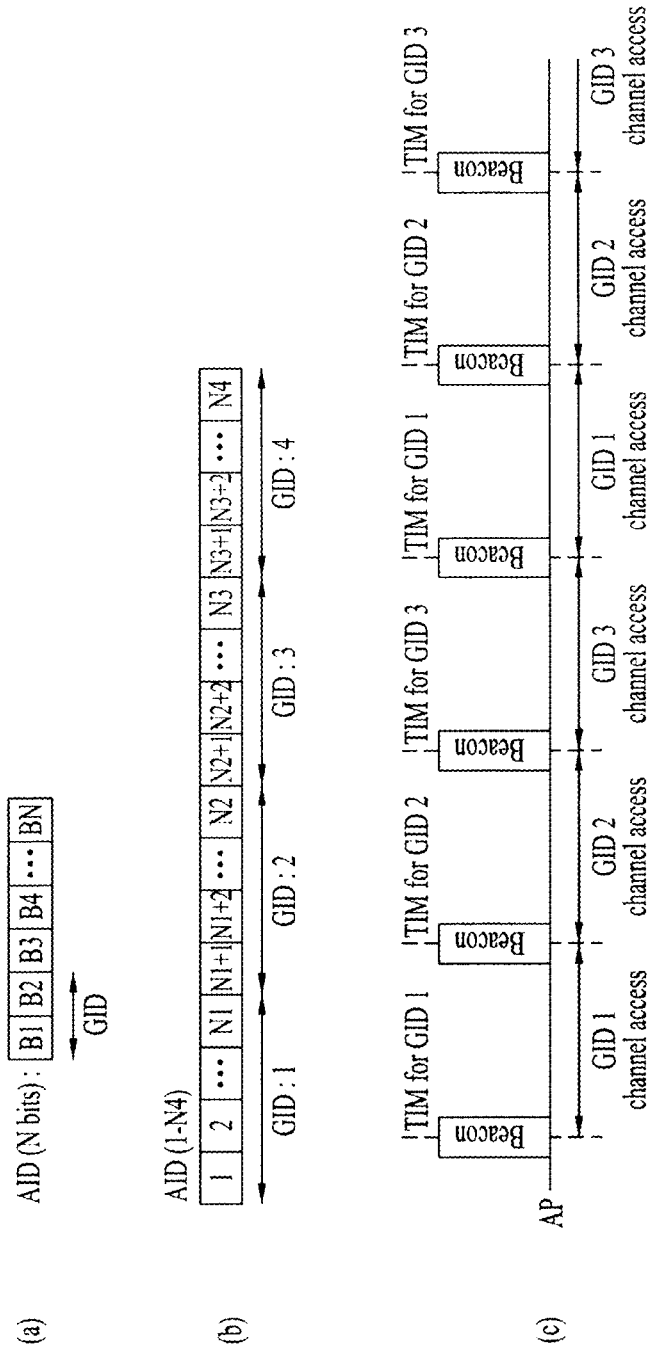
FIG. 13 is a conceptual diagram illustrating a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such grouping will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of the AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame and a TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, if a large TIM is divided into small blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Improved Channel Access Method

Figure 14:
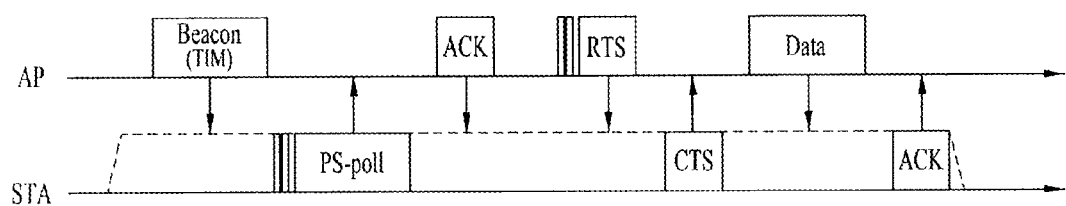
FIG. 14 is a conceptual diagram illustrating a PS-Poll mechanism.

FIG. 14 is a conceptual diagram illustrating a PS-Poll mechanism. In more detail, FIG. 14 is a detailed example of the PS-Poll mechanism shown in FIG. 11.

As described above, the STA may recognize the presence or absence of data to be transmitted from the AP to the STA through a TIM element of the beacon. The STA having recognized the presence of data to be transmitted thereto, may transmit the PS-Poll frame to the AP so as to request data (i.e., DL data) from the AP. The AP having received the PS-Poll frame may transmit data to the STA through contention. In more detail, the AP configured to attempt to transmit data may transmit the RTS frame to the STA having received the data. The STA to be used for data reception transmits the CTS frame so that it can indicate that the STA is ready to receive data. Therefore, the AP may transmit a data frame to the STA, and may receive the ACK frame. In this case, the AP may transmit only one Physical layer Service Data Unit (PSDU) to the STA once. Therefore, if there is a large amount of data to be sent from the AP to the STA, the AP must transmit data through contention in response to a new PS-Poll from the STA, so that data transmission may be inefficiently carried out.

Figure 15:
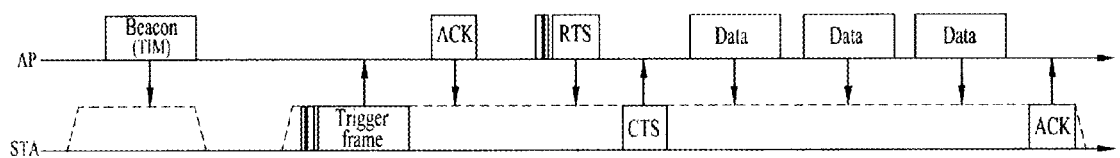
FIG. 15 is a conceptual diagram illustrating an Unscheduled-Automatic Power Save Delivery (U-APSD) mechanism.

FIG. 15 is a conceptual diagram illustrating an Unscheduled-Automatic Power Save Delivery (U-APSD) mechanism.

Referring to FIG. 15, according to the U-APSD (Unscheduled-Automatic Power Save Delivery) mechanism, in order to use a U-APSD SP, the STA can inform the AP of a requested transmission duration and the AP can transmit a frame to the STA for the SP. According to the U-APSD mechanism, the STA can simultaneously receive a plurality of PSDUs from the AP.

Referring to FIG. 15, the STA may recognize the presence of data to be transmitted from the STA to the AP through the TIM element of the beacon. The STA can recognize that the AP has data to be sent thereto through a TIM element of a beacon. Then, the STA can request the AP to transmit while signaling to the AP that the SP of the STA starts by transmitting a trigger frame to the AP at a desired time. The AP can transmit ACK as a response to the trigger frame. Subsequently, the AP can transmit an RTS to the STA through contention, receive a CTS frame from the STA and then transmit data to the STA. Here, the data transmitted by the AP can be composed of one or more data frames. When the AP sets the end of service period (EOSP) of the last data frame to 1 and transmits the last data frame to the STA, the STA can recognize the EOSP and end the SP. Accordingly, the STA can transmit ACK indicating that the STA has successfully received the data. According to the U-APSD mechanism, the STA can start the SP thereof at a desired time to receive data and receive multiple data frames within a single SP, thereby achieving efficient data reception.

In the meantime, as shown in FIGS. 14 and 15, an exchange of the RTS/CTS frames during data transmission/reception (Tx/Rx) times so as to prevent the occurrence of the hidden node problem may cause a large amount of signaling overhead to both of the data transmission/reception sides. In addition, as shown in FIG. 15, a long period of time from a start time, at which the STA transmits the trigger frame and requests data transmission to the AP, to an end time, at which the AP prepares for data to be sent to the STA, transmits/receives the RTS/CTS frames through contention for data transmission and finally transmits data, is consumed such that the STA consumes a large amount of power.

For example, under the hidden node environment, there may be an STA that cannot perform overhearing of the PS-Poll frames sent from other STAs, and PS-Poll frames may be simultaneously transferred from a plurality of STAs so that there may occur unexpected collision between the PS-Poll frames. Moreover, under the environment in which a large number of STAs can be associated with one AP as in M2M communication, the hidden node problem may more frequently occur. Although the legacy CTS/RTS frame exchange method for solving the hidden node problem is used, power consumption caused by transmission/reception (Tx/Rx) of the CTS/RTS frames may cause large load in case of low-power STA, etc. appropriate for M2M communication.

Improved CCA Operation

The present invention provides a new rule for the CCA operation. In more detail, the present invention proposes a new CCA rule for use in the case in which STA is shifted from a doze state (or a sleep state) to an awake state.

In order for the STA operating in the power save (PS) mode to transmit uplink traffic, the STA switches from the doze state to the awake state and then must perform the CCA operation. For example, other STAs perform data transmission/reception (Tx/Rx) operations at a specific time at which a certain STA switches from the doze state to the awake state, so that the STAs may occupy the channel. In this case, the awake STA confirms the presence or absence of transmission/reception (Tx/Rx) operations of other STAs (i.e., CCA execution), and performs the Tx operation only when the channel is not occupied, such that transmission/reception (Tx/Rx) operation of other STAs can be protected.

In the legacy IEEE 802.11 standard, the CCA rule applied when STA is shifted from the doze state to the awake state is defined as follows. A STA that is changing from Doze to Awake in order to transmit data shall perform CCA until a frame sequence is detected by which it can correctly set its NAV, or until a period of time equal to the Probe Delay has transpired.

In accordance with the CCA rule, it is necessary to perform CCA until the frame sequence capable of correctly establishing the NAV is detected, and the corresponding time may be limited to a Probe Delay value as necessary.

In this case, NAV is an indicator occupied by each STA. In more detail, in case of both a first case in which a wireless medium is in a busy state due to the CCA function of the STA and a second case in which the wireless medium is not in the busy state, the NAV indicates a time period in which the STA must not initiate data transmission to the WM. The frame sequence may indicate one or more frames, each of which is configured to transmit one data unit (e.g., MAC Service Data Unit (MSDU)). If one MSDU is divided into a plurality of fragments and transmitted through a plurality of frames, the plurality of fragments has the same one frame sequence number. Probe Delay may indicate a delay value to be applied prior to the case in which STA is changed from the doze state to the awake state. For example, Probe Delay may be set to a maximum PPDU (PLCP Physical Layer Convergence Protocol) transmission time. That is, Probe Delay may be used when the frame sequence in which NAV is established is not detected.

The above-mentioned legacy CCA rule can prevent transmission collision between STAs without any problem. The following problems may occur in the evolved system (i.e., IEEE 802.11ah system in which a BSS having large service coverage is introduced.

For example, even when a certain STA performs CCA by detecting a frame sequence capable of correctly establishing the NAV and starts data transmission at a specific time at which an idle channel state is decided, there may arise the problem in which transmission/reception (Tx/Rx) of other STAs operated in the corresponding channel cannot be protected in the following hidden node environment.

Figure 16:
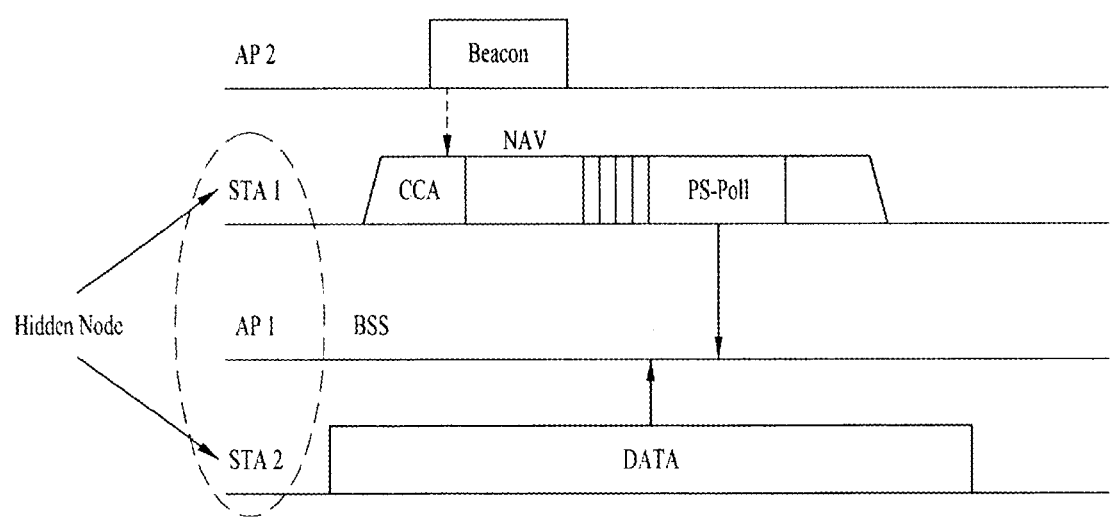
FIG. 16 is a conceptual diagram illustrating a legacy Clear Channel Assessment (CCS) operation in a hidden node environment.

FIG. 16 is a conceptual diagram illustrating a legacy Clear Channel Assessment (CCS) operation in the hidden node environment.

In FIG. 16, it is assumed that STA1, STA2, and AP2 belong to the same BSS, and AP2 belongs to another BSS. In addition, it is also assumed that STA1 and STA2 are mutual hidden nodes.

As can be seen from FIG. 16, while STA transmits a data frame to AP1, STA1 may be switched from the doze state to the awake state. The awake STA1 can receive (or overhear) the beacon frame of the AP2 contained in another BSS instead of a BSS to which the awake STA1 belongs, and can correctly establish the NAV of STA1 on the basis of a parameter (e.g., duration field) contained in the beacon frame. That is, according to the current CCA rule, when using a frame sequence capable of correctly establishing the NAV, CCA is performed before the corresponding frame sequence is detected irrespective of a transmission entity of the corresponding frame sequence. Thereafter, STA1 does not perform data transmission during the established NAV period. If NAV has expired, STA1 may perform channel access through contention (e.g., a back off operation). In this case, STA1 may transmit the PS-Poll frame to AP (i.e., AP1) of a BSS to which STA1 belongs so as to perform channel access. Therefore, transmission of a data frame of STA1 may collide with transmission f the PS-Poll frame of STA1. This problem may occur because STA1 acting as a hidden node of STA2 does not receive (or overhear) a data frame of STA2 being occupied a current channel. That is, according to the legacy CCA rule, if STA1 can correctly establish its own NAV value through an arbitrary frame of another BSS under the hidden node situation, there may arise the problem in which transmission of STA2 acting as a hidden node of STA1 cannot be protected.

Therefore, the present invention provides a new CCA rule for preventing the occurrence of the above-mentioned problem. A new CCA rule proposed by the present invention can be defined as follows. A STA that is changing from Doze to Awake in order to transmit data shall perform CCA until a frame sequence in the same BSS is detected by which it can correctly set its NAV, or until a period of time equal to the Probe Delay has transpired.

CCA must be carried out until the frame sequence capable of correctly establishing the NAV is detected and the CCA execution time is limited to the Probe Delay value in the same manner as in the legacy CCA rule. In contrast, according to the new CCA rule, a specific condition in which the frame sequence must be a frame sequence belonging to the same BSS may be added as necessary. That is, CCA must be carried out until NAV is correctly established by the frame sequence belonging to the same BSS.

In accordance with the new CCA rule, although STA1 performs overhearing of the beacon frame of AP2 under the situation of FIG. 16, and the beacon frame corresponds to the frame sequence capable of correctly establishing the NAV, the beacon frame does not correspond to the frame sequence transmitted in the same BSS as that of STA1, so that STA1 must continuously perform the CCA operation. That is, STA1 continuously performs the CCA operation before receiving the frame sequence that is capable of correctly establishing the NAV while being transmitted in the same BSS, so that it is possible for STA1 acting as a hidden node to perform data transmission during transmission of the STA data frame.

Target Awake Time (TAT)

As described above, the legacy CCA rule has been defined to perform CCA when STA is switched from the doze state to the awake state. If the STA performs CCA, associated power consumption may occur. The present invention provides a new concept called a target awake time (TAT) to reduce or remove power consumption.

The target awake time (TAT) may indicate a specific value that is allocated and transmitted to STA (s) by the AP. In more detail, the target awake time (TAT) may indicate a specific time at which STA(s) operated in the PS mode are switched from the doze state to the awake state. In addition, STA(s) awakened at the target awake time may be established not to perform the CCA operation.

Therefore, a protocol associated with the target awake time (TAT) can be defined as follows. At the target awake time, (1) STA is changed from Doze to Awake in order to perform data transmission, performs CCA until a period of time equal to the Probe Delay has transpired; and (2) TXOP (Transmission Opportunity) or transmission within a TXOP shall not extend across a target awake time.

In this case, TXOP is defined as a time interval during which a specific STA has authority to initiate frame exchange on WM, and may be established by a start time and a maximum duration value.

The above-mentioned item (1) may indicate that the awakened STA according to the target awake time (TAT) configuration does not perform the CCA operation for NAV configuration. In more detail, the STA switched from the doze state to the awake state at the target awake time (TAT) does not perform CCA for NAV configuration, and can immediately initiate the back off process and the channel access operation.

In this case, no limited interpretation must be applied to STA, that is awakened at the target awake time (TAT) performs the CCA operation. That is, STA may perform the CCA operation during a predetermined time at a target awake time (TAT) as necessary. In this case, the predetermined time in which the STA performs CCA may be shorter than the Probe Delay time.

The above-mentioned item (2) may indicate that any transmission/reception (Tx/Rx) of STA is not allowed at the target awake time (TAT). For example, assuming that TXOP is in progress, the corresponding TXOP may be configured to stop before the target awake time (TAT). In other words, TXOP may be configured not to overlap with the target awake time (TAT). In addition, assuming that the target awake time (TAT) indicates a boundary of time slots to be described later, TXOP may not cross the boundary of the time slots.

The AP may establish a plurality of target awake times (TATs) within the beacon interval (i.e., a time period to a beacon frame transmission time subsequent to a single beacon frame transmission time), and may inform STA(s) of the target awake time (TAT) configuration.

Figure 17:
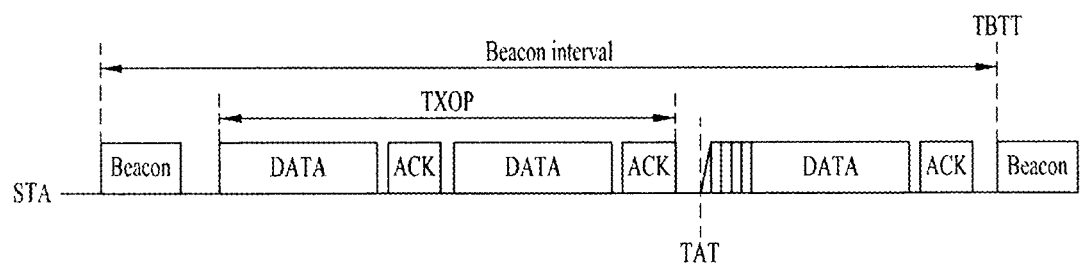
FIG. 17 is a conceptual diagram illustrating a channel access operation for use in the case in which a target awake time is established.

FIG. 17 is a conceptual diagram illustrating a channel access operation for use in the case in which a target awake time is established.

Referring to FIG. 17, if the target awake time (TAT) is established in STA operating in the PS mode, a doze-state STA may be switched from the target awake time (TAT of FIG. 17) to the awake state. Although a plurality of TATs may be established during a single beacon interval, only one TAT is exemplarily shown in FIG. 17 for clarity. The single beacon interval may be represented by a time period ranging from a transmission time of a certain beacon frame to a Target Beacon Transmission Time (TBTT). TBTT may correspond to the next beacon transmission (Tx) time.

In accordance with the present invention, STA awakened at TAT does not perform the CCA operation, and may immediately transmit the data frame after passing through the back off process. For example, unlike the conventional operation in which STA transitions to the awake state as in STA2 of FIG. 16 and performs the CCA operation until receiving the frame sequence capable of correctly establishing the NAV, STA transitioned to the awake state at TAT as shown in FIG. 17 may not perform the CCA operation until reaching a predetermined time corresponding to Probe Delay.

In addition, STA in which TAT is established may be configured in a manner that TXOP does not include TAT. In this case, an underway TXOP may stop operation prior to a specific time corresponding to TAT. In the example of FIG. 17, TXOP at which STA performs transmission/reception (Tx/Rx) operations related to another STA (e.g., AP) upon reception of the beacon frame may be stopped prior to TAT.

FIG. 18 is a conceptual diagram illustrating an exemplary target awake time (TAT) information element format according to an exemplary embodiment.

Target awake time (TAT) information element (IE) shown in FIG. 18 may be transferred to the STA by AP. A target awake time (IE) may be additionally contained in the legacy frame such as a beacon frame, a probe response frame, and an association response frame. Alternatively, the target awake time IE may also be contained in a new format frame for transmitting the target awake time IE.

In FIG. 18, the element ID field may be set to a specific value indicating that the corresponding IE is a target awake time (TAT) IE. The Length field may be set to a specific value indicating that the length of each subsequent field is represented in units of a predetermined unit (e.g., in units of octet. The subsequent fields may include a Target Awake Time Start Offset field, a Target Awake Time interval field, target awake STAs at the target awake time #n, or a GID (Target Awake STAs or GID at Target Awake Time #n) field, etc.

The target awake time (TAT) start offset field may indicate a start time of the target awake time (TAT), and may be set to a specific value by which the target awake time is spaced apart from a predetermined reference time. The predetermined reference time may be TBTT. For example, the target awake time start offset may indicate how far the start time of the target awake time is distant from TBTT. Although FIG. 18 shows that the target awake time start offset field is 4 octets long, the scope or spirit of the present invention is not limited thereto, and the target awake time start offset field may also be defined as a different-sized field according to the range of a time start offset value or the like.

The target awake time (TAT) interval field may indicate a time interval between two contiguous target awake times. For example, if a plurality of TATs is established in a single beacon interval, a time point of a first target awake time may be decided by the above target awake time start offset, and a time point of the subsequent target awake time may be set to a specific time that is spaced apart from the target awake time start offset value by the target awake time interval value. For example, the spacing between the target awake times (TATs) may be equally set to a specific value provided from the target awake time interval (TAT).

Figure 19:
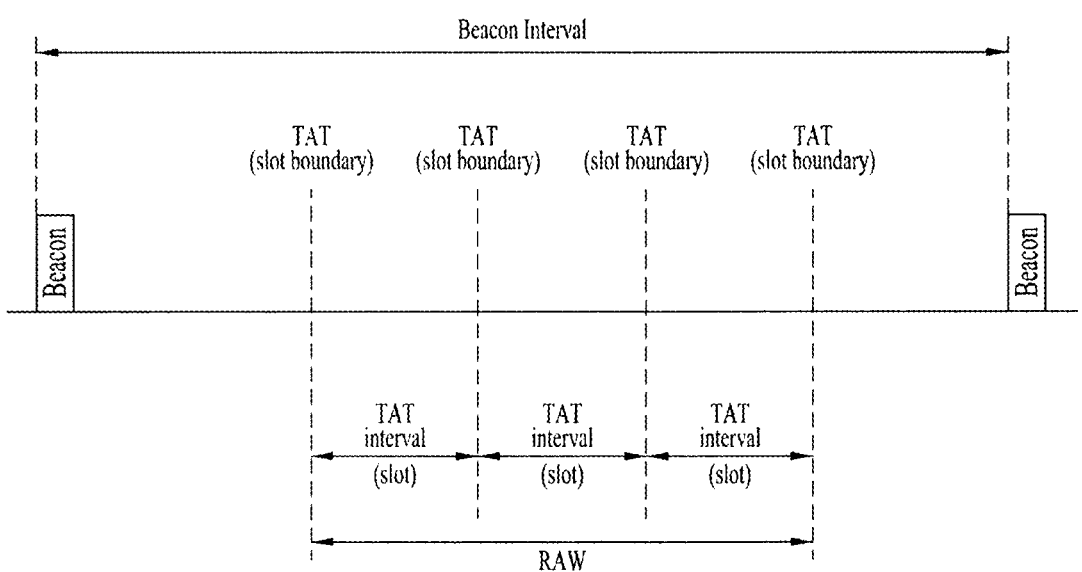
FIG. 19 is a conceptual diagram illustrating a target awake time interval according to an exemplary embodiment.

FIG. 19 is a conceptual diagram illustrating a target awake time (TAT) interval according to an exemplary embodiment.

As can be seen from FIG. 19, the target awake time interval may also be appreciated as a time slot. That is, if a plurality of time points (i.e., a plurality of target awake times (TATs)) at which STA awakes to perform channel access are established, a time interval between the time points may be represented by a slot (i.e., a target awake time (TAT) interval). In this case, the target awake time may also be appreciated as a slot boundary.

As described above, STA, that has awakened at the target awake time (TAT), can immediately perform channel access through a back off process without CCA execution, such that the target awake time (TAT) interval may also be denoted by a time period in which channel access is restrictively allowed for the STA awakened from the target awake time (i.e., channel access of another STA in which TAT is not established is prohibited). Therefore, the time interval (e.g., a time interval composed of three TAT intervals of FIG. 19) including at least one target awake time interval may also be denoted by a restricted access window (RAW) according to the present invention. That is, specific information indicating the position and length of the target awake time interval shown in FIG. 18 may also be understood as RAW configuration information, and this information may be decided by AP and signaled to the STA.

Although FIG. 18 exemplarily shows that the target awake time (TAT) interval field is 4 octets long, the scope or spirit of the present invention is not limited thereto, and the target awake time start (TAT) interval field may also be defined as a different-sized field according to the range of a time start offset value or the like.

Referring back to FIG. 18, the target awake STAs at a target awake time #n or a GID field (hereinafter referred to as a target awake STA field) thereat may include ID information of TA(s), channel access of which is allowed at Target Awake Time #n. If several target awake times (TATs) are established in a single beacon interval, the target awake time #n (n=1, 2, . . . ) may be sequentially indexed to the TATs.

In addition, the target awake STA field may include a plurality of subfields. One subfield may include ID(s) (e.g., AID) of one or more STAs, channel access of which is allowed at one TAT. As an example for indicating an identifier (ID) (i.e., the list of ID information of STA(s) being channel-accessed at a single TAT #n) of the STA contained in one subfield, the range information (i.e., {start AID, end AID}) of the AID being 4 bits long may be used for the above example.

In addition, as shown in FIG. 18, assuming that one subfield from among the target awake STA field is 4 octets long and includes N subfields, the length of the target awake STA field may be denoted by 4*n octets. However, the scope or spirit of the present invention is not limited thereto, the target awake STA field may have different sizes according to the number of STAs being channel-accessed at one TAT, the number of STAs within one AP, and the ID type (e.g., a complete AID field or a partial AID field) of the STA.

If several STAs are grouped (or paired) into one MU-MIMO group, a group identifier (GID) may be contained in the target awake STA field. For example, in association with a plurality of target awake time interval (or a plurality of slots constructing RAW), the channel access permission interval of the STA group based on GID may be allocated in units of a target awake time interval (or slot).

Synchronization Frame

As described above, if a target awake time (or a slot boundary) is established in the STA by AP, the corresponding STA may perform channel access without CCA. In more detail, if TXOP is configured not to include a target awake time (or a slot boundary), the STA configured to switch from the target awake time (or a slot boundary) to the awake state may immediately perform channel access without CCA execution.

In the Overlapping BSS (OBSS) environment, when the STA awakes at a target awake time established by one BSS and performs channel access, Tx/Rx operations may be carried out at another BSS, resulting in the occurrence of collision in Tx/Rx operations. In addition, a clock signal of the doze-state STA may not be synchronized with a clock signal of another STA located in the same BSS due to various reasons. In this case, the channel access of the STA switched to the awake state may collide with transmission of another STA belonging to the corresponding BSS.

Therefore, the present invention can allow the AP to transmit a frame (hereinafter referred to as a synchronization frame) for time synchronization to the STA, such that the AP can easily perform channel access without CCA execution whenever the STA awakes at a target awake time (or a slot boundary). In more detail, the present invention can transmit a synchronization frame to the corresponding STA in response to a target awake time (or a slot boundary) of the STA. In this case, the synchronization frame may be considered an uplink synchronization frame in case of using UL transmission of the STA.

In accordance with the present invention, STA(s) that are switched from the doze state to the awake state at a target awake time (or a slot boundary) can listen to the synchronization frame, and can initiate the channel access protocol after being synchronized with the BSS using the synchronization frame.

In addition, the present invention proposes a synchronization frame is composed of a Null Data Packet (NDP) frame format. In accordance with the present invention, medium (or channel) synchronization must be performed within a very short period of time in such a manner that STA(s) changing from the doze state to the awake state at the target awake time (or a slot boundary) can immediately perform the channel access operation. Since the frame format of the present invention does not include a data field in a different way from the legacy frame format, so that it may be preferable that the synchronization frame be configured in the form of the NDP frame having a very short length. Therefore, power consumption needed for the STA configured to receive the synchronization frame can be minimized.

FIG. 20 is a conceptual diagram illustrating an NDP frame format according to an exemplary embodiment.

FIG. 20(a) shows a legacy basic Physical Layer Convergence Protocol (PLCP) Packet Data Unit (PPDU) frame format.

The legacy PPDU frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG field) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

FIG. 20(b) exemplarily shows the legacy CTS frame format.

Referring to FIG. 20(b), the legacy CTS frame is defined as the MAC frame format, and may correspond to a control frame according to frame categories. The MAC frame may be basically composed of a MAC header, a frame body, and a Frame Check Sequence. The MAC frame is composed of MAC PDUs, such that it can be transmitted or received through PSDU of a data part of the PPDU frame format of FIG. 20(a).

In the example of FIG. 20(b), the CTS frame format may be comprised of a frame control field, a duration field, a Receiving Address (RA) field, and an FCS field. The frame control field may include control information needed for frame transmission/reception. The duration field may be set to a specific time at which the corresponding frame or the like is transmitted, and may be used to configure NAVs of other STAs. The RA field may correspond to an address of the STA configured to receive the CTS frame. In this case, the MAC header may be comprised of the frame control field, the duration field, and the RA field. That is, the CTS frame format may be comprised of the MAC header and the FCS only without inclusion of the frame body.

The frame control field may include a protocol version field, a Type field, a Subtype field, a To DS field, a From DS field, a More Fragment (MF) field, a Retry field, a Power Management (PM) field, a More Data (MD) field, a Protected Frame (PF) field, and an Order field.

FIG. 20(c) shows the NDP frame format proposed by the present invention. The NDP frame may represent the frame structure having no data packet. That is, the NDP frame may represent a frame format that includes the initial PLCP preamble part and the SIG field of FIG. 20(a) without inclusion of the remaining parts (i.e., data field). In association with a frame transmitted from the STA to the AP and another frame transmitted from the AP to the STA for channel access, the NDP frame format shown in FIG. 20(c) is used, so that the embodiment of the present invention can reduce a delay time while simultaneously reducing power consumption of the STA. For example, the NDP frame may be used as a synchronization frame of the present invention.

In more detail, the STA, that is switched to the awake state at a target awake time (TAT) established for a specific STA by the AP, may perform channel access without CCA execution. In order for the corresponding STA to be quickly synchronized with a medium (or channel), the AP may transmit the synchronization frame composed of the NDP frame to the STA.

In the case in which the NDP frame format is configured as shown in FIG. 20(c), the data field (e.g., MAC control frame of FIG. 20(b)) of FIG. 20(a) is not included in the NDP frame format, so that information corresponding to the frame control field of PSDU (i.e., MAC frame) is not contained therein. However, a minimum amount of control information must be contained in the NDP frame so as to transmit/receive the NDP frame. For this purpose, the present invention provides a method for including a minimum amount of control information for synchronization in the SIG field of FIG. 20(c).

That is, as described above, the NDP frame may include STF, LTF and SIG field only. In this case, each of STF and LTF may be composed of a channel estimation signal (or sequence) needed for decoding the SIG field. The SIG filed may include a plurality of subfields. For example, the SIG field may include a duration subfield, a BSSID subfield, etc. In addition, the SIG field may include additional subfields as well as the above two subfields, and the order of subfields is only exemplary rather than restrictive.

The BSSID subfield may be used to identify the AP of the NDP frame (i.e., a synchronization frame) of FIG. 20(c). In addition, the BSSID subfield may correspond to a Partial BSSID (PBSSID) defined as an abbreviated format of the BSSID. In addition, the BSSID subfield may correspond to a predetermined ID value (e.g., a new AID format, or a resultant value obtained by hashing of the legacy AID) for identifying the corresponding AP.

The subfield may be used when the remaining STAs other than the STA receiving the corresponding NDP frame (i.e., a synchronization frame) configure the NAV. That is, the duration subfield may indicate a time needed for transmission of the CT frame or a time needed for transmission of the data/management frame and ACK reception, such NAV configuration may be achieved in a manner that other STAs do not perform transmission during the corresponding time.

Alternatively, from the viewpoint of the STA configured to receive the NDP frame (i.e., a synchronization frame), if the duration subfield is set to zero 0, it can be understood that channel access of the corresponding STA is permitted as soon as the corresponding NDP frame (i.e., a synchronization frame) is received. If the duration subfield is not set to zero 0, this means that channel access of the corresponding STA is permitted after lapse of a predetermined time corresponding to the duration subfield value on the basis of the reception time of the corresponding NDP frame (i.e., a synchronization frame). If the duration subfield is set to zero 0, the same function as in a CF (Contention Free)-END frame is carried out. If the duration subfield is not set to zero 0, the duration subfield may be used in a similar way to a CF (Contention Free)-Poll frame.

The CRC subfield may be used to detect errors of the SIG field of the NDP frame.

The NDP frame of FIG. 20(c) may be transmitted, as a synchronization frame, to the corresponding STA at a target awake time (or a slot boundary) of a certain STA.

Figure 21:
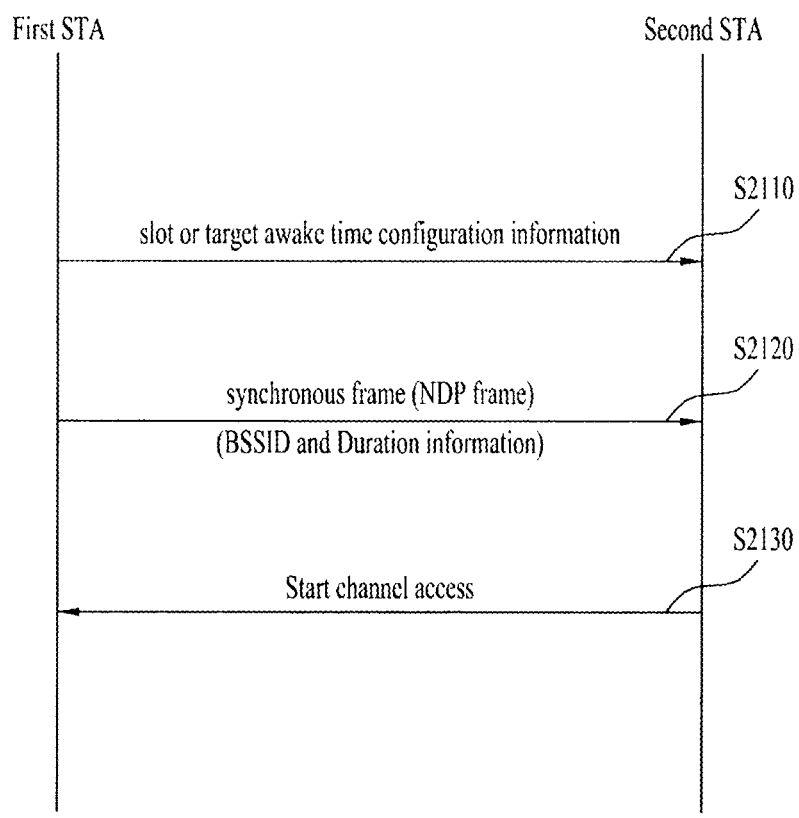
FIG. 21 is a flowchart illustrating a channel access method according to an exemplary embodiment.

FIG. 21 is a flowchart illustrating a channel access method according to an embodiment of the present invention.

In step S2110, configuration information regarding at least one slot (or a target awake time (TAT) interval) and at least one slot boundary (or a target awake time TAT) may be applied to the second STA (e.g., non-AP STA).

In step S2120, a first STA may transmit a synchronization frame at a slot boundary (or a target awake time) of the second STA. The synchronization frame may be composed of the NDP frame as shown in FIG. 20(c), and may include BSSID information and duration information.

In step S2130, the second STA is switched to the awake state at a slot boundary (or a target awake time) established by the first STA. After reception of the synchronization frame in step S2120, the second STA may perform channel access. If the slot boundary overlapping of TXOP is prohibited, the second STA may immediately perform channel access in step S2130 without CCA execution. The channel access start may include the operation for transmitting the frame through contention (i.e., through a back off process).

As shown in FIG. 21, the second STA, that is switched to the awake state at a slot boundary (or a target awake time) using the synchronization frame composed of the NDP frame, performs channel access without CCA execution, such that power consumption of the second STA can be minimized.

The above described various embodiments of the present invention may be independently applied or two or more embodiments thereof may be simultaneously applied.

Figure 22:
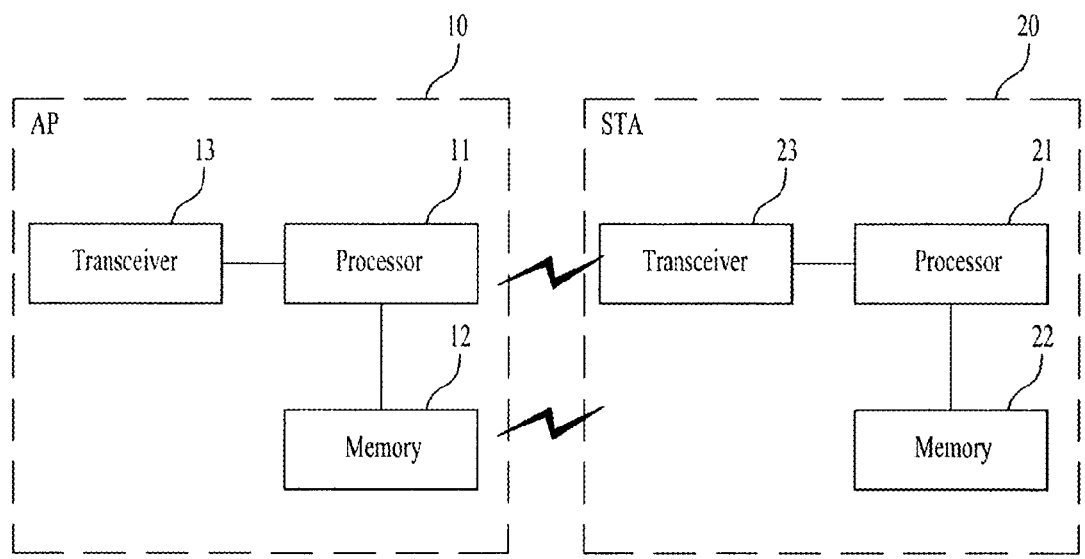
FIG. 22 is a block diagram illustrating a radio frequency (RF) device according to an embodiment of the present invention.

FIG. 22 is a block diagram illustrating a radio frequency (RF) device according to an embodiment of the present invention.

Referring to FIG. 25, an AP 10 may include a processor 11, a memory 12, and a transceiver 13. An STA 20 may include a processor 21, a memory 22, and a transceiver 13. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 can be configured to perform operations according to the above-described embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The overall configuration of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A method for performing channel synchronization by a station (STA) of a wireless communication system, the method comprising:

receiving configuration information regarding at least one slot in which channel access of the station (STA) is allowed, from an access point (AP);

receiving a synchronization frame from the access point (AP) at a slot boundary of the at least one slot; and performing the channel synchronization on the basis of the synchronization frame, wherein the synchronization frame is a null data packet (NDP) frame, which is a Physical Layer Packet Data Unit (PPDU) frame including a Short Training Field (STF), a Long Training Field (LTF) and a signal (SIG) field without inclusion of a data field, and wherein the SIG field includes a Basic Service Set Identifier (BSSID) field and a duration field.

2. The method according to claim 1, wherein the BSSID field includes identifier (ID) information of the access point (AP).

3. The method according to claim 1, wherein a Network Allocation Vector (NAV) of stations (STAs) other than the station (STA) is configured on the basis of a value of the duration field.

4. The method according to claim 1, wherein the station (STA) is switched form a doze state to an awake state.

5. The method according to claim 1, wherein:
if a transmission opportunity (TXOP) of the station (STA) is not allowed to overlap the slot boundary, channel access is initiated without performing clear channel assessment (CCA).

6. The method according to claim 5, wherein the CCA is performed until a frame sequence for allowing the station (STA) to configure a network allocation vector (NAV), or until a period of time equal to a ProbeDelay value has transpired.

7. The method according to claim 1, wherein the slot boundary is a time point at which channel access of the station (STA) is allowed.

8. The method according to claim 7, wherein the slot is an interval between two contiguous time points.

9. The method according to claim 7, wherein the time point at which the channel access is allowed is a target awake time of the station (STA).

10. The method according to claim 1, wherein a plurality of slots is configured during a single beacon interval.

11. The method according to claim 1, wherein the configuration information of the at least one slot is provided through a beacon frame.

12. The method according to claim 1, wherein the configuration information of the at least one slot is configuration information of a time period in which restricted channel access of the station (STA) is allowed.

13. A station (STA) device configured to perform channel synchronization in a wireless communication system, comprising:
a transceiver; and
a processor,
wherein the processor is configured to:
receive configuration information regarding at least one slot in which channel access of the station (STA) is allowed, from an access point (AP) using the transceiver,
receive a synchronization frame from the access point (AP) at a slot boundary of the at least one slot using the transceiver, and
perform the channel synchronization on the basis of the synchronization frame,
wherein the synchronization frame is a null data packet (NDP) frame, which is a Physical Layer Packet Data Unit (PPDU) frame including a Short Training Field (STF), a Long Training Field (LTF), and a signal (SIG) field without inclusion of a data field, and
wherein the SIG field includes a Basic Service Set Identifier (BSSID) field and a duration field.

* * * * *